United States Patent
Mizuno et al.

(10) Patent No.: US 10,493,394 B2
(45) Date of Patent: Dec. 3, 2019

(54) POROUS MATERIAL, METHOD FOR MANUFACTURING POROUS MATERIAL, AND HONEYCOMB STRUCTURE

(71) Applicant: NGK INSULATORS, LTD., Nagoya (JP)

(72) Inventors: Atsushi Mizuno, Nagoya (JP); Ryuta Kouno, Nagoya (JP); Shuichi Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 256 days.

(21) Appl. No.: 15/468,529

(22) Filed: Mar. 24, 2017

(65) Prior Publication Data

US 2017/0282108 A1 Oct. 5, 2017

(30) Foreign Application Priority Data

Mar. 31, 2016 (JP) ................. 2016-070561

(51) Int. Cl.
*B01D 46/24* (2006.01)
*B01D 46/00* (2006.01)
*F01N 3/02* (2006.01)
*F01N 3/022* (2006.01)

(52) U.S. Cl.
CPC ..... *B01D 46/2429* (2013.01); *B01D 46/0001* (2013.01); *B01D 46/247* (2013.01); *F01N 3/0222* (2013.01); *B01D 2046/2433* (2013.01); *B01D 2046/2481* (2013.01); *Y02T 10/20* (2013.01)

(58) Field of Classification Search
None
See application file for complete search history.

(56) References Cited

U.S. PATENT DOCUMENTS

| 7,348,289 B2 * | 3/2008 | Ichikawa ............. B01D 53/885 502/174 |
| 7,473,464 B2 | 1/2009 | Morimoto et al. |
| 8,092,740 B2 | 1/2012 | Morimoto et al. |

(Continued)

FOREIGN PATENT DOCUMENTS

| DE | 10 2015 003 218 A1 | 9/2015 |
| EP | 1 214 973 B1 | 6/2011 |

(Continued)

OTHER PUBLICATIONS

German Office Action (with English translation), German Application No. 10 2017 205 259.7, dated Aug. 27, 2018.

(Continued)

*Primary Examiner* — Amber R Orlando
(74) *Attorney, Agent, or Firm* — Burr & Brown, PLLC

(57) ABSTRACT

Provided is a porous material which is not easily damaged even when being exposed to a high temperature in a low oxygen atmosphere, and has heat resistance improved. A porous material includes aggregates formed of a nonoxide containing silicon and a binding material formed of an oxide ceramic binding the aggregates to each other while keeping a plurality of pores. The porous material has a phase containing oxygen on a surface of the aggregates including a boundary surface with the binding material. In the porous material, a content ratio of oxygen in the aggregates is preferably from 2 to 25% by mass relative to the mass of the aggregates.

18 Claims, 3 Drawing Sheets

(56) References Cited

U.S. PATENT DOCUMENTS

| | | | |
|---|---|---|---|
| 2005/0143255 A1* | 6/2005 | Morimoto | B01D 39/2093 502/178 |
| 2005/0159310 A1* | 7/2005 | Ohno | B01D 53/945 502/439 |
| 2006/0003889 A1* | 1/2006 | Furukawa | B01D 53/9422 502/178 |
| 2006/0029768 A1* | 2/2006 | Furukawa | B01J 27/224 428/116 |
| 2006/0029769 A1* | 2/2006 | Ichikawa | B01D 39/2062 428/116 |
| 2009/0065982 A1 | 3/2009 | Morimoto et al. | |
| 2014/0370232 A1 | 12/2014 | Izumi et al. | |
| 2014/0370233 A1* | 12/2014 | Izumi | B01D 39/20 428/116 |
| 2015/0259254 A1* | 9/2015 | Ichikawa | C04B 38/0009 428/116 |
| 2015/0266779 A1* | 9/2015 | Miyairi | B01D 39/2075 428/116 |

FOREIGN PATENT DOCUMENTS

| | | |
|---|---|---|
| JP | 2003-292388 A1 | 10/2003 |
| WO | 2013/146953 A1 | 10/2013 |

OTHER PUBLICATIONS

German Office Action (Application No. 10 2017 205 259.7) dated Feb. 26, 2018.
Japanese Office Action (with English translation), Japanese Application No. 2016-070561, dated Jul. 23, 2019 (6 pages).

* cited by examiner

POROUS MATERIAL, METHOD FOR MANUFACTURING POROUS MATERIAL, AND HONEYCOMB STRUCTURE

The present application is an application based on JP 2016-070561 filed on Mar. 31, 2016 with Japan Patent Office, the entire contents of which are incorporated herein by reference.

BACKGROUND OF THE INVENTION

Field of the Invention

The present invention relates to a porous material, a method for manufacturing a porous material, and a honeycomb structure. More specifically, the present invention relates to a porous material which is not easily damaged even when being exposed to a high temperature in a low oxygen atmosphere, and has heat resistance improved, a method for manufacturing a porous material, and a honeycomb structure.

Description of the Related Art

Conventionally, a honeycomb structure has been used, for example, as a filter for trapping and removing a particulate matter (particulate) included in a dust-containing fluid such as an exhaust gas of a diesel engine (diesel particulate filter (DPF)).

As a constituent material of this honeycomb structure (filter), fire-resistant silicon carbide (SiC), cordierite, or the like, a composite material thereof, or the like is used (for example, see Patent Document 1).

[Patent Document 1] JP-A-2003-292388

SUMMARY OF THE INVENTION

However, in some cases, oxidation decomposition of silicon carbide occurs to the honeycomb structure described in Patent Document 1 to damage the honeycomb structure described in Patent Document 1 structure when the honeycomb structure described in Patent Document 1 is exposed to a high temperature in a low oxygen atmosphere. Specifically, when silicon carbide is heated in a low oxygen atmosphere, according to formula (1): $SiC+O_2 \rightarrow SiO\uparrow + CO\uparrow$, an oxidation reaction different from usual passive oxidation to form $SiO_2$, called "active oxidation" proceeds. In this active oxidation, when generated SiO in a gas state causes an oxidation reaction, heat is generated excessively. Therefore, a honeycomb structure may be damaged by this heat generation.

Here, during regeneration of a filter (that is, during an operation to burn and remove a particulate accumulated in the filter), oxygen is consumed by burning of the particulate. Therefore, during regeneration, the filter is exposed to a low oxygen atmosphere. That is, the honeycomb structure described in Patent Document 1 is exposed to a low oxygen atmosphere during regeneration thereof, and the above oxidation reaction proceeds. Thereafter, heat is generated excessively in the honeycomb structure, and the honeycomb structure may be damaged due to this heat generation.

The present invention has been achieved in view of the above problems. The present invention provides a porous material which is not easily damaged even when being exposed to a high temperature in a low oxygen atmosphere, and has heat resistance improved, a method for manufacturing a porous material, and a honeycomb structure.

According to a first aspect of the present invention, a porous material including; aggregates formed of a nonoxide containing silicon and a binding material formed of an oxide ceramic binding the aggregates to each other while keeping a plurality of pores is provided, wherein the porous material has a phase containing oxygen on a surface of the aggregates including a boundary surface with the binding material.

According to a second aspect of the present invention, the porous material described in the first aspect provided, in which a content ratio of oxygen in the aggregates is from 2 to 25% by mass relative to the mass of the aggregates.

According to a third aspect of the present invention, the porous material described in the first or second aspects is provided, in which the phase containing oxygen contains cristobalite.

According to a fourth aspect of the present invention, the porous material described in any one of the first to third aspects is provided, in which the binding material contains crystalline cordierite in an amount of 50% by mass or more relative to the total amount of the binding material.

According to a fifth aspect of the present invention, the porous material described in the fourth aspect is provided, in which the binding material further contains at least one selected from a group consisting of amorphous cordierite, alumina, mullite, spinel, sapphirine, and cristobalite.

According to a sixth aspect of the present invention, the porous material described in any one of the first to fifth aspects is provided, in which the phase containing oxygen has a film thickness of 0.2 to 3.0 µm.

According to a seventh aspect of the present invention, the porous material described in any one of the first to sixth aspects is provided, in which the aggregates are formed of silicon carbide.

According to an eighth aspect of the present invention, the porous material described in any one of the first to seventh aspects is provided, having a porosity of 35 to 75%.

According to a ninth aspect of the present invention, the porous material described in any one of the first to eighth aspects is provided, having a thermal expansion coefficient of $5.5 \times 10^{-6}$/K or less.

According to a tenth aspect of the present invention, a method for manufacturing a porous material is provided, including a forming step of obtaining a mixture by adding and mixing a raw material for a binding material containing a cordierite forming raw material and an organic binder to powdery aggregates formed of a nonoxide containing silicon, and then forming the mixture to obtain a formed body, a firing step of calcinating the obtained formed body in an atmosphere containing oxygen to remove the organic binder in the formed body, and then firing the formed body in a temperature range of 1370 to 1450° C. to obtain a porous fired body in which the powdery aggregates are bound to each other with an oxide ceramic, and a porous material forming step of subjecting the obtained fired body to a heat treatment in a temperature range of 1000 to 1400° C. in an atmosphere containing oxygen, and thereby forming a phase containing oxygen on a surface of the powdery aggregates including a boundary surface with the oxide ceramic to obtain a porous material.

According to an eleventh aspect of the present invention, the method for manufacturing a porous material described in the tenth aspect is provided, in which the phase containing oxygen contains an alkali metal in an amount of 0.05% by mass or more relative to the porous material.

According to a twelfth aspect of the present invention, a honeycomb structure formed by the porous material described in any one of the first to ninth aspects is provided, having a shape including a partition wall defining a plurality of cells extending from a first end face as one end face to a second end face as the other end face.

According to a thirteenth aspect of the present invention, the honeycomb structure described in the twelfth aspect is provided, including a plugging portion disposed in each of an open end of a predetermined cell on the first end face and an open end of a residual cell on the second end face.

A porous material according to the present invention is not easily damaged even when being exposed to a high temperature in a low oxygen atmosphere, and has heat resistance improved.

A method for manufacturing a porous material according to the present invention can manufacture a porous material which is not easily damaged even when being exposed to a high temperature in a low oxygen atmosphere, and has heat resistance improved.

A honeycomb structure according to the present invention is not easily damaged even when being exposed to a high temperature in a low oxygen atmosphere, and has heat resistance improved.

DESCRIPTION OF THE PREFERRED EMBODIMENTS

Hereinafter, an embodiment of the present invention will be described specifically with reference to the drawings. The present invention is not limited to the following embodiment. It should be understood that matters obtained by performing modification of the following embodiment, improvement thereof, or the like appropriately within a range not departing from the gist of the present invention based on usual knowledge of a person skilled in the art are also included in the scope of the present invention.

Figure 1:
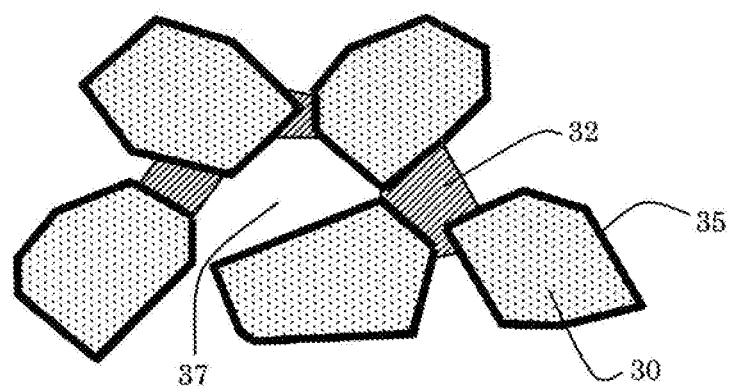
FIG. 1 is an enlarged cross-sectional view schematically showing an embodiment of a porous material according to the present invention.

(1) Porous Material:

As shown in FIG. 1, an embodiment of a porous material according to the present invention includes aggregates 30 formed of a nonoxide containing silicon and a binding material 32 formed of an oxide ceramic binding the aggregates 30 to each other while keeping a plurality of pores 37. The porous material of the present embodiment has a phase 35 containing oxygen on a surface of the aggregates 30 including a boundary surface with the binding material 32. FIG. 1 is an enlarged cross-sectional view schematically showing an embodiment of a porous material according to the present invention.

Such a porous material has a phase containing oxygen (hereinafter, also referred to as "oxidation film") on a surface of the aggregates including a boundary surface with the binding material, and therefore is not easily damaged even when being exposed to a high temperature in a low oxygen atmosphere, and has heat resistance improved.

Here, in a conventional porous body including silicon carbide as aggregate and metal silicon as a binding material, a surface of the conventional porous body exposed to outside air may be covered with an oxidation film in order to prevent oxidation on a surface of the conventional porous body. As described above, it is known a technology to prevent oxidation on a surface of a porous body by covering a surface exposed to outside air with an oxidation film. However, in the present invention, an oxidation film is formed also on a surface including a boundary surface between aggregates and a binding material, and excellent heat resistance of the porous material is realized due to formation of this oxidation film.

(1-1) Aggregates:

Aggregates are formed of a nonoxide containing silicon. Examples of the aggregates include silicon carbide (SiC) particles, silicon nitride ($Si_3N_4$) particles, and mullite ($Al_6Si_2O_{13}$) particles. Among these particles, silicon carbide (SiC) particles or silicon nitride ($Si_3N_4$) particles are preferable, and silicon carbide (SiC) particles are more preferable. By using silicon carbide (SiC) particles as the aggregates, a thermal conductivity is increased advantageously.

A content ratio of oxygen in the aggregates is preferably from 2 to 25% by mass, and more preferably from 7 to 17% by mass relative to the mass of the aggregates. By setting the content ratio in the above range, both heat resistance and thermal shock resistance can be obtained. When the content ratio of oxygen in the aggregates is less than the above lower limit value, SiC as the aggregates is oxidized, and therefore a filter may be damaged in a low oxygen atmosphere. When the content ratio of oxygen in the aggregates is more than the above upper limit value, thermal expansion is increased, and therefore thermal shock resistance may be reduced. Note that "content ratio of oxygen in the aggregates" is a value calculated by Rietvelt analysis using X-ray diffraction. The Rietvelt analysis method is a method for refining an obtained diffraction pattern using a crystal structure parameter in each crystal.

An average particle diameter of the aggregates is preferably from 8 to 52 μm, more preferably from 10 to 45 μm, and particularly preferably from 13 to 35 μm. When the average particle diameter of the aggregates is less than the above lower limit value, a pressure loss may be increased. When the average particle diameter of the aggregates is more than the above upper limit value, in a case of forming a honeycomb structure, clogging of a die is caused, and poor forming may be caused. Note that "the average particle diameter of the aggregates" is a value measured using a laser diffraction method.

(1-2) Phase Containing Oxygen:

The phase containing oxygen is formed on a surface including a boundary surface between the aggregates and the binding material. As described above, by formation of the phase containing oxygen on the surface including a boundary surface, excellent heat resistance of the porous material is realized.

The phase containing oxygen (oxidation film) is only required to be formed on a surface including a boundary surface between the aggregates and the binding material. That is, in the present invention, an oxidation film may be formed on the entire surface of the aggregates (including a boundary surface between the aggregates and the binding material), or may be formed on a surface including at least a part of the boundary surface in the aggregates. Note that a case where an oxidation film is formed on the entire surface of the aggregates means a case where it has been confirmed that in any field of vision (200 to 5000 times) for confirming an oxidation film, all the aggregates in this field of vision are covered with an oxidation film using an X-ray microanalyzer electron probe micro analyzer (EPMA).

The phase containing oxygen preferably contains cristobalite (crystalline silica). Such a phase is present stably even under an engine drive environment, and can suppress heat generation by active oxidation of SiC. Note that presence of cristobalite in the phase containing oxygen can be confirmed using X-ray diffraction.

A content ratio of cristobalite in the phase containing oxygen is preferably from 5 to 25% by mass, and more preferably from 8 to 21% by mass. By setting the content ratio in the above range, heat generation by oxidation of SiC can be suppressed. When the content ratio of cristobalite in the phase containing oxygen is less than the above lower limit value, heat generation by active oxidation of SiC occurs, and therefore a filter may be damaged. When the content ratio of cristobalite in the phase containing oxygen is more than the above upper limit value, thermal expansion is increased, and therefore thermal shock resistance may be reduced. Note that "content ratio of cristobalite in the phase containing oxygen" is a value measured using X-ray diffraction.

The phase containing oxygen may contain Ce, Na, Mg, Al, or Fe in addition to cristobalite.

A film thickness of the phase containing oxygen is preferably from 0.2 to 3.0 μm, more preferably from 0.5 to 2.5 μm, and particularly preferably from 0.6 to 2.0 μm. By setting the film thickness of the phase containing oxygen in the above range, heat generation by active oxidation of SiC can be suppressed. When the film thickness of the phase containing oxygen is less than the above lower limit value, heat generation by active oxidation of SiC occurs, and therefore a filter may be damaged. When the film thickness of the phase containing oxygen is more than the above upper limit value, a thermal conductivity is reduced, therefore a temperature difference is easily generated in a filter, and thermal shock resistance may be reduced. Note that the film thickness of the phase containing oxygen means a value obtained by measuring a position of a phase containing oxygen present around SiC a plurality of times using a scanning electron microscope (SEM) or EPMA, and averaging the obtained measured values.

Note that the film thickness of the phase containing oxygen can be adjusted by adjusting a heat treatment temperature or heat treatment time.

(1-3) Binding Material:

The binding material is formed of an oxide ceramic binding the aggregates to each other while keeping a plurality of pores. In this way, the binding material binds the aggregates to each other while keeping a plurality of pores, and thus a porous material in which a plurality of pores are formed can be obtained.

Specific examples of the oxide ceramic include cordierite, mullite, and alumina.

The binding material contains crystalline cordierite in an amount preferably of 50% by mass or more, and more preferably of 70 to 95% by mass relative to the total amount of the binding material. By setting the content ratio of crystalline cordierite in the binding material in the above range, thermal expansion can be reduced, and a thermal stress can be suppressed. When the content ratio of crystalline cordierite in the binding material is less than 50% by mass, thermal expansion is increased, therefore thermal shock resistance is deteriorated, and a filter may be damaged. Note that "content ratio of crystalline cordierite in the binding material" is a value measured using X-ray diffraction.

The binding material preferably contains at least one selected from a group consisting of amorphous cordierite, alumina, mullite, spinel, sapphirine, and cristobalite. The binding material further contains these components, and progress of a crack to a binding portion can be thereby suppressed. Whether the binding material contains these components can be confirmed using SEM or X-ray diffraction.

A porosity of the porous material according to the present invention is preferably from 35 to 75%, more preferably from 40 to 72%, and particularly preferably from 50 to 70%. When the porosity of the porous material is less than the above lower limit value, a pressure loss may be increased. When the porosity of the porous material is more than the above upper limit value, the strength is lowered, and a honeycomb structure may be broken when the honeycomb structure is formed from the porous material according to the present invention and is housed in a can body. Note that the "the porosity of the porous material" is a value calculated from a total pore volume (unit: $cm^3/g$) by a mercury press-in method (in conformity with JIS R 1655) and an apparent density (unit: $g/cm^3$) by an underwater Archimedes method.

An average pore diameter of the porous material according to the present invention is preferably from 8 to 32 μm, more preferably from 10 to 27 μm, and particularly preferably from 12 to 23 μm. When the average pore diameter of the porous material is less than the above lower limit value, a pressure loss may be increased. When the average pore diameter of the porous material is more than the above upper limit value, in a case of using the porous material of the present embodiment as DPF or the like, a part of particulate matters in an exhaust gas may pass through DPF or the like without being trapped. Here, the average pore diameter is a value measured by a mercury press-in method (in conformity with JIS R 1655).

The bending strength of the porous material according to the present invention is preferably 5 MPa or more, more preferably 7 MPa or more, and particularly preferably 9 MPa or more. When the bending strength of the porous material is less than the above lower limit value, thermal shock resistance may be reduced. The upper limit is about 50 MPa in view of a configuration of the porous material of the present embodiment. Here, the bending strength is a value measured by "a bending test" in conformity with JIS R 1601.

A thermal expansion coefficient of the porous material according to the present invention is preferably $5.5 \times 10^{-6}$/K or less, more preferably from $2.0 \times 10^{-6}$ to $5.3 \times 10^{-6}$/K, and particularly preferably from $2.0 \times 10^{-6}$ to $5.0 \times 10^{-6}$/K. Note that a smaller thermal expansion coefficient is more preferable. However, the lower limit is $2.0 \times 10^{-6}$/K in view of a configuration of the present invention. When the thermal expansion coefficient of the porous material is more than the above upper limit value, thermal shock resistance is reduced, and therefore a filter may be damaged. Note that "the thermal expansion coefficient" is a value measured by a method in conformity with JIS R 1618. Specifically, for example, when the porous material is a honeycomb structure, the thermal expansion coefficient is obtained by cutting out a test piece of vertical 3 cells× horizontal 3 cells× length 20 mm from the honeycomb structure, and measuring a thermal expansion coefficient in an A-axis direction (direction in which a cell of the honeycomb structure extends) at 40 to 800° C.

Figure 2:
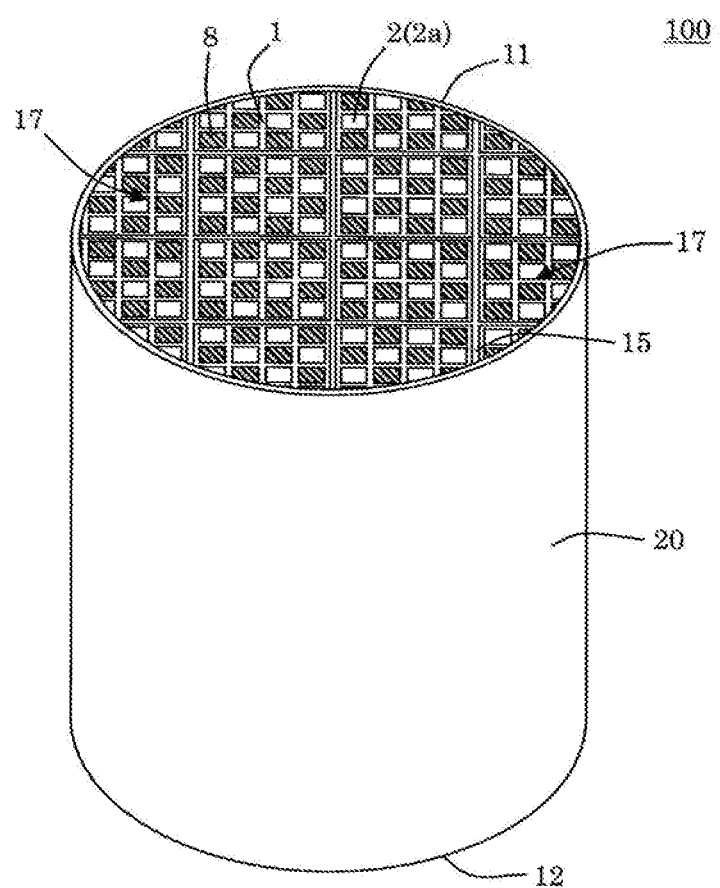
FIG. 2 is a perspective view schematically showing an embodiment of a honeycomb structure according to the present invention.
Figure 3:
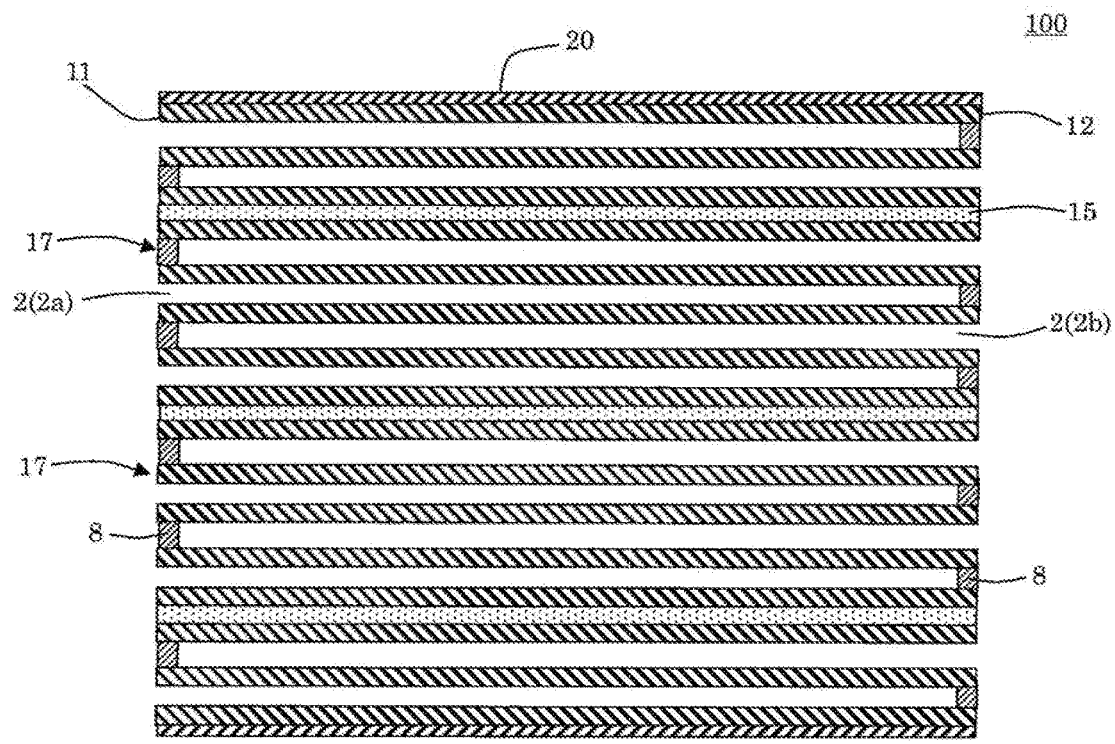
FIG. 3 is a cross-sectional view schematically showing a cross section parallel to a direction in which a cell of an embodiment of a honeycomb structure according to the present invention extends.

(2) Honeycomb Structure:

An embodiment of a honeycomb structure according to the present invention is a honeycomb structure 100 shown in FIGS. 2 and 3. The honeycomb structure 100 is formed by the above-described porous material according to the present invention. The honeycomb structure 100 has a shape including a partition wall 1 defining a plurality of cells 2 extending from a first end face 11 as one end face to a second end face 12 as the other end face.

The honeycomb structure 100 is formed by the above-described porous material according to the present invention, therefore is not easily damaged even when being exposed to a high temperature in a low oxygen atmosphere, and has heat resistance improved.

The thickness of the partition wall 1 is preferably from 100 to 500 μm, and more preferably from 125 to 400 μm. When the thickness of the partition wall 1 is less than the above lower limit value, the strength is lowered, and therefore a honeycomb structure may be broken when the honeycomb structure is housed in a can body. When the thickness of the partition wall 1 is more than the above upper limit value, a pressure loss may be increased.

A cell shape (cell shape in a cross section perpendicular to a direction in which a cell extends) of the honeycomb structure 100 is not particularly limited. Examples of the cell shape include a triangle, a quadrangle, a hexagon, an octagon, a circle, and a combination thereof. Among quadrangles, a square or a rectangle is preferable.

A cell density of the honeycomb structure 100 is preferably from 15 to 77 cells/cm$^2$, more preferably from 20 to 62 cells/cm$^2$, and particularly preferably from 23 to 54 cells/cm$^2$. When the cell density is less than the above lower limit value, the strength is lowered, and therefore a honeycomb structure may be broken when the honeycomb structure is housed in a can body. When the cell density is more than the above upper limit value, a pressure loss may be increased.

The shape of a honeycomb structure is not particularly limited, but examples thereof include a round pillar shape and a pillar shape having a polygonal (triangle, quadrangle, pentagon, hexagon, or the like) bottom surface.

As shown in FIGS. 2 and 3, the honeycomb structure 100 includes a plurality of pillar-shaped honeycomb segments 17 and a bonding layer 15 disposed so as to bond side surfaces of the honeycomb segments 17 to each other. By forming such a segmented structure, a stress applied to a honeycomb structure when the honeycomb structure is used as a filter can be relaxed.

The honeycomb structure 100 includes a plugging portion 8 disposed in each of an open end of a predetermined cell 2 (outflow cell 2b) on the first end face 11 and an open end of a residual cell 2 (inflow cell 2a) on the second end face 12. When the honeycomb structure according to the present invention is used as DPF or the like, the honeycomb structure preferably has such a structure (a structure including the plugging portion 8 as described above). That is, an exhaust gas which has flowed in the honeycomb structure according to the present invention is filtered by a partition wall because the honeycomb structure includes the plugging portion 8. Therefore, particulate matters in the exhaust gas can be trapped favorably. Note that the inflow cell 2a and the outflow cell 2b are arranged alternately in the honeycomb structure 100. A checkered pattern is thereby formed by the plugging portion 8 and the "open ends of cells" on each of the first end face 11 and the second end face 12 in the honeycomb structure 100.

A material of the plugging portion 8 may be the same as or different from a material of the honeycomb segments 17.

As shown in FIGS. 2 and 3, the honeycomb structure 100 may have an outer periphery coat layer 20 in an outer periphery thereof. The outer periphery coat layer 20 can be made of the same material as the honeycomb segments. By forming the outer periphery coat layer 20, a defect such as breakage is hardly generated even when an external force is applied to the honeycomb structure 100 during transportation thereof.

(3) Method for Manufacturing Porous Material:

The porous material according to the present invention can be manufactured by the following method. That is, the porous material according to the present invention can be manufactured by a method including a forming step, a firing step, and a porous material forming step. The forming step is a step of obtaining a mixture by adding and mixing a raw material for a binding material containing a cordierite forming raw material and an organic binder to powdery aggregates formed of a nonoxide containing silicon, and then forming the mixture to obtain a formed body. The firing step is a step of calcinating the formed body in an atmosphere containing oxygen to remove the organic binder in the formed body, and then firing the formed body in a temperature range of 1370 to 1450° C. to obtain a porous fired body in which the powdery aggregates are bound to each other with an oxide ceramic. The porous material forming step is a step of subjecting the obtained fired body to a heat treatment in a temperature range of 1000 to 1400° C. in an atmosphere containing oxygen, and thereby forming a phase containing oxygen on a surface of the powdery aggregates including a boundary surface with the oxide ceramic to obtain a porous material.

The method for manufacturing a porous material according to the present invention forms a phase containing oxygen on a surface of the aggregates (including a boundary surface between the aggregates and the binding material). As a result, a porous material which is not easily damaged even when being exposed to a high temperature in a low oxygen atmosphere, and has heat resistance improved can be manufactured.

Note that according to the present manufacturing method, when the binding material is formed of cordierite, impurities contained in the binding material, such as sodium move to an oxidation film on the boundary surface between the binding material and the aggregates. Therefore, purity of the binding material formed of cordierite is increased (that is, a melting point of the binding material is raised), and heat resistance is improved.

Hereinafter, the method for manufacturing a porous material according to the present invention will be described for each step.

(3-1) Forming Step:

First, a raw material for a binding material containing a cordierite forming raw material and an organic binder are added and mixed to powdery aggregates, and then, a surfactant, a pore former, water, or the like is added thereto as necessary, to obtain a mixture. Thereafter, the obtained mixture is formed to obtain a formed body. The raw material for a binding material becomes a binding material by firing. The raw material for a binding material contains a rare earth element or a zirconium element in addition to the cordierite forming raw material.

Examples of the powdery aggregates formed of a nonoxide containing silicon include silicon carbide (SiC) particles, silicon nitride ($Si_3N_4$) particles, and mullite ($Al_6Si_2O_{13}$) particles. Among these particles, silicon carbide (SiC) particles and silicon nitride ($Si_3N_4$) particles are preferable, and silicon carbide (SiC) particles are more preferable.

The average particle diameter of the powdery aggregates is preferably from 8 to 52 μm, and more preferably from 10 to 45 μm. The average particle diameter of the powdery aggregates is a value measured by a laser diffraction method.

The cordierite forming raw material means a raw material which becomes cordierite by firing. Specifically, the cordierite forming raw material is a ceramic raw material obtained by mixing "predetermined raw materials" such that chemical compositions of silica ($SiO_2$), alumina ($Al_2O_3$), and magnesia (MgO) are within ranges of 42 to 56% by mass, 30 to 45% by mass, and 12 to 16% by mass, respectively. Examples of the "predetermined raw materials" include talc, kaolin, an alumina source raw material, and silica. The alumina source raw material means a raw material for forming an oxide by firing and forming a part of cordierite, such as aluminum oxide, aluminum hydroxide, or boehmite.

Examples of the organic binder include methyl cellulose, hydroxypropoxyl cellulose, hydroxyethyl cellulose, hydroxypropylmethyl cellulose, carboxymethyl cellulose, and polyvinyl alcohol. The content of the organic binder is preferably from 3 to 10 parts by mass relative to the total 100 parts by mass of the powdery aggregates and the raw material for a binding material.

Examples of the surfactant include ethylene glycol, dextrin, fatty acid soap, and polyalcohol. These compounds may be used singly or in combination of two or more kinds thereof The content of the surfactant is preferably 3 parts by mass or less relative to the total 100 parts by mass of the powdery aggregates and the raw material for a binding material.

The pore former is not particularly limited as long as becoming pores after firing, and examples thereof include graphite, starch, a foamable resin, a water absorbable resin, and silica gel. These compounds may be used singly or in combination of two or more kinds thereof.

The content of the pore former is preferably from 0.3 to 40 parts by mass relative to the total 100 parts by mass of the powdery aggregates and the raw material for a binding material.

The average particle diameter of the pore former is preferably from 10 to 70 μm.

The mixture can be formed into a desired shape. A shape to be formed or a forming method is not particularly limited, but can be determined appropriately so as to be suitable for an application.

Note that a raw material for a porous material (a formed body in a case where this raw material for a porous material has been formed into a specific shape) is preferably dried. A drying method is not particularly limited. Examples thereof include an electromagnetic wave heating method such as microwave heating drying or high-frequency dielectric heating drying, and an external heating method such as hot air drying or superheated steam drying.

(3-2) Firing Step:

In this step, calcinating can be performed in an atmosphere containing oxygen at 200 to 600° C. for 0.5 to 20 hours. The "atmosphere containing oxygen" is preferably an air atmosphere.

Firing is performed in a temperature range of 1370 to 1450° C., preferably in a temperature range of 1380 to 1420° C. By performing firing in such a temperature range, the cordierite forming raw material is softened and adheres to the aggregates, the aggregates and the binding material are bound satisfactorily, and a sufficient strength is obtained. When the temperature of firing is lower than the above lower limit value, the aggregates and the binding material are bound insufficiently, and the strength is lowered disadvantageously. On the other hand, when the temperature of firing is higher than the above upper limit value, crystalline cordierite becomes amorphous. Therefore, a thermal expansion coefficient is increased, and thermal shock resistance is reduced disadvantageously.

An atmosphere during firing is preferably a non-oxidation atmosphere such as nitrogen or argon, or an atmosphere having an oxygen partial pressure of 10% or less.

In addition, firing is preferably performed at a normal pressure. In addition, firing time is preferably from 1 to 20 hours. Note that calcinating and firing can be performed using an electric furnace or a gas furnace, for example.

(3-3) Porous Material Forming Step:

In this step, a fired body is subjected to a heat treatment in a temperature range of 1000 to 1400° C. in an atmosphere containing oxygen. This temperature range is preferably from 1050 to 1350° C. By performing the heat treatment in such a temperature range, a phase containing oxygen is formed on a surface of the aggregates (including a boundary surface between the aggregates and the binding material). As a result, a porous material which is not easily damaged even when being exposed to a high temperature in a low oxygen atmosphere, and has heat resistance improved can be obtained. When the temperature for the heat treatment is lower than the above lower limit value, a phase containing oxygen on a surface of SiC is insufficient, and therefore a filter is damaged disadvantageously. On the other hand, when the temperature for the heat treatment is higher than the above upper limit value, the amount of cristobalite formed on a surface of SiC is increased, a thermal expansion coefficient is increased, and therefore thermal shock resistance is reduced disadvantageously.

Heat treatment time of the fired body is preferably from 1 to 20 hours, and more preferably from 2 to 10 hours. The heat treatment time here means maximum temperature holding time. When the heat treatment time is less than the above lower limit value, a phase containing oxygen on a surface of SiC is insufficient, and therefore a filter is damaged disadvantageously. On the other hand, when the heat treatment time is more than the above upper limit value, the amount of cristobalite formed on a surface of SiC is increased, a thermal expansion coefficient is increased, and therefore thermal shock resistance is reduced disadvantageously.

In this step, the "atmosphere containing oxygen" is preferably a condition of an oxygen concentration of 0.1% or more.

As described above, note that according to the present manufacturing method, when the binding material is formed of cordierite, impurities formed of an alkali metal such as sodium, contained in the binding material move to a boundary surface between the binding material and the aggregates. Therefore, the phase containing oxygen contains impurities such as an alkali metal. Here, the phase containing oxygen preferably contains an alkali metal in an amount of 0.05% by mass or more relative to a porous material (0.05% by mass or more relative to a honeycomb structure in a case where the porous material is the honeycomb structure). The phase containing oxygen contains an alkali metal more preferably in an amount of 0.06 to 0.5% by mass, particularly preferably in an amount of 0.08 to 0.3% by mass relative to a porous material. By satisfying such a range, the phase containing oxygen can trap an alkali metal in a binding phase. Therefore, a softening temperature of the binding phase can be improved. When a content ratio of an alkali metal in the phase containing oxygen is less than 0.05% by mass, the phase containing oxygen does not trap an alkali metal, and a binding phase is softened at a low temperature.

Therefore, there is a risk that a desired shape (for example, a honeycomb shape) cannot be maintained.

(4) Method for Manufacturing Honeycomb Structure:

As a method for manufacturing a honeycomb structure according to the present invention, a similar method to the above-described method for manufacturing a porous material according to the present invention can be employed except that a honeycomb formed body is obtained by performing extrusion using a die such that the mixture has a honeycomb shape in the forming step in the above-described method for manufacturing a porous material according to the present invention.

EXAMPLES

Hereinafter, the present invention will be described more specifically based on Examples. The present invention is not limited by the Examples in any way.

Example 1

First, powdery silicon carbide (powdery aggregates) and a raw material for a binding material were mixed at a mass ratio of 76.5:23.5. An organic binder, a pore former, a surfactant, and water were added thereto to prepare plastic kneaded material (mixture). Note that as the raw material for a binding material, a cordierite forming raw material containing 7.8% by mass of talc, 10.0% by mass of alumina, and 12.9% by mass of colloidal silica was used. As the organic binder, methyl cellulose was used. The powdery silicon carbide had an average particle diameter of 20 μm.

The obtained kneaded material was subjected to extrusion to obtain a quadrangular pillar-shaped honeycomb formed body (formed body) having a partition wall thickness of 300 μm, a cell density of 50 cells/cm$^2$, a square end face with one side of 35 mm, and a length of 150 mm.

This honeycomb formed body was calcinated in an air atmosphere at 450° C. for 10 hours. Thereafter, firing was performed at 1400° C. for five hours to prepare a porous fired body (honeycomb fired body).

Subsequently, the obtained honeycomb fired body was subjected to a heat treatment in an atmosphere containing oxygen (in an air atmosphere) at 1220° C. for seven hours to prepare a honeycomb structure (porous material). This honeycomb structure included a partition wall defining a plurality of cells extending from a first end face as one end face to a second end face as the other end face. In the obtained honeycomb structure, a phase containing oxygen (phase containing 12.8% by mass cristobalite) was formed on the entire surface of the powdery aggregates including a boundary surface with a binding material (cordierite). The phase containing oxygen had a thickness of 1.3 μm.

For the obtained honeycomb structure, measurement of the following items was performed. Note that a "softening temperature" was measured as follows. Table 1 shows results thereof.

Porosity was calculated from a total pore volume (unit: cm$^3$/g) by a mercury press-in method (in conformity with JIS R 1655) and an apparent density (unit: g/cm$^3$) by an underwater Archimedes method.

An average pore diameter was measured by a mercury press-in method (in conformity with JIS R 1655).

A thermal expansion coefficient was measured by a method in conformity with JIS R 1618.

The bending strength was measured by "a bending test" in conformity with JIS R 1601.

(Measurement of Softening Temperature)

Figure 4:
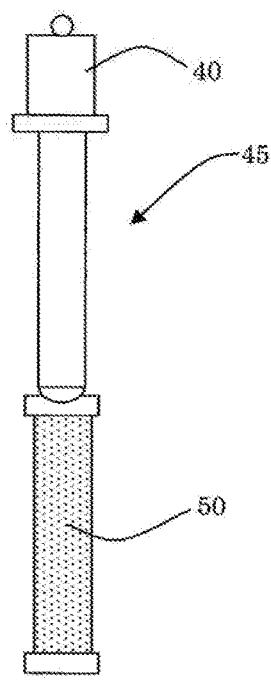
FIG. 4 is an explanatory diagram in measurement of a softening temperature.
Figure 5:
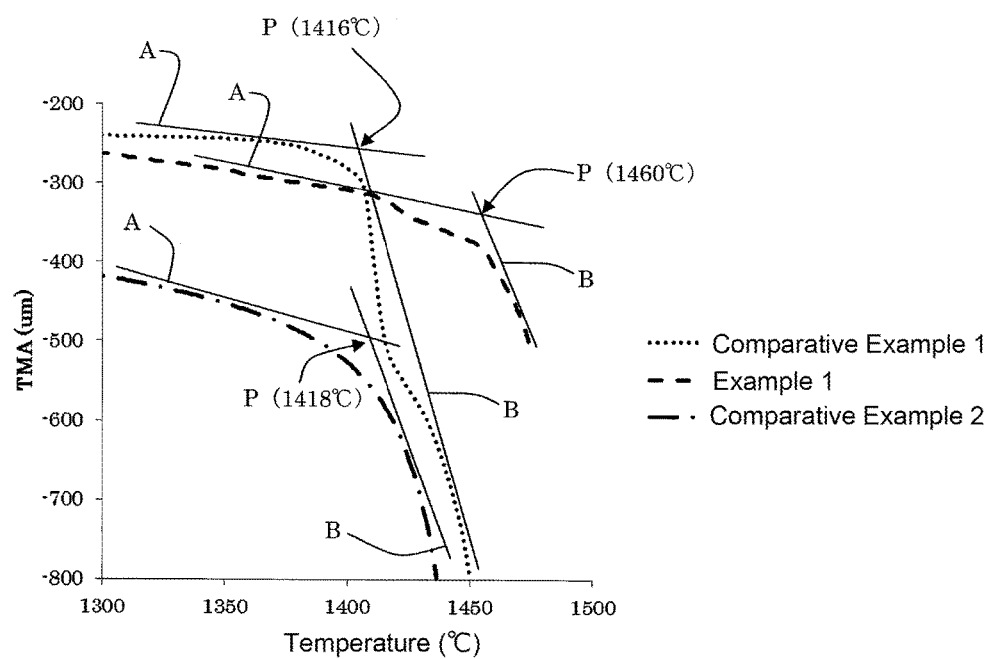
FIG. 5 is a graph showing a measurement result (dimensional shrinkage curve) of a softening temperature in each of Example 1 and Comparative Examples 1 and 2.

First, a quadrangular pillar-shaped test piece 50 having a square end face with one side of 6.4 mm and a length of 50 mm was cut out from the obtained honeycomb structure. Subsequently, this test piece 50 was installed in a measurement apparatus 45 as shown in FIG. 4, a weight (balance weight 40 of 50 g) was put thereon, and a load was applied thereto. While the load was applied to the test piece 50, the test piece 50 was heated to 1500° C. at a temperature rising rate of 7.5° C./min. During this time, the dimension of the test piece 50 was measured continuously, and a dimensional shrinkage curve (see FIG. 5) was drawn. In the obtained dimensional shrinkage curve, tangents A and B were drawn before and after a large dimensional change was confirmed, and a temperature at an intersection P at which these tangents A and B intersected with each other was determined (see FIG. 5). The temperature at the intersection P was used as a "softening temperature".

(Total Evaluation)

Total evaluation was performed from results of the above items. As an evaluation criterion, a case where each of a porosity, an average pore diameter, a thermal expansion coefficient, a bending strength, and a softening temperature satisfied a particularly preferable range sufficiently was evaluated as "A". A case where any one of a porosity, an average pore diameter, a thermal expansion coefficient, a bending strength, and a softening temperature satisfied a preferable range but was outside a particularly preferable range was evaluated as "B". A case where any one of a porosity, an average pore diameter, a thermal expansion coefficient, and a bending strength was outside a preferable range was evaluated as "C". A case where a softening temperature was outside a preferable range (1420° C. or higher) was evaluated as "D".

TABLE 1

| | | ratio between aggregates and binding material | | binding material | | | | | | phase containing oxygen | | content |
|---|---|---|---|---|---|---|---|---|---|---|---|---|
| | | | | | amount of cordierite in binding material % by mass | firing | | heat treatment | | film thickness μm | component content % by mass | ratio of alkali metal % by mass |
| | aggregates kind of aggregates | aggregates % by mass | binding material % by mass | kind contained in binding material | | temperature ° C. | time hr | temperature ° C. | time hr | | | contained in phase sodium |
| Example 1 | SIC | 76.5 | 23.5 | cordierite, mullite, alumina | 80 | 1400 | 5 | 1220 | 7 | 1.3 | 12.8 | sodium 0.22 |
| Example 2 | SIC | 76.5 | 23.5 | cordierite, mullite, alumina | 80 | 1400 | 5 | 1250 | 5 | 0.9 | 8.3 | sodium 0.15 |
| Example 3 | SIC | 76.5 | 23.5 | cordierite, mullite, alumina | 80 | 1400 | 5 | 1300 | 5 | 1.5 | 13.1 | sodium 0.25 |

TABLE 1-continued

| | | binding material | | | | | | | phase containing oxygen | | content |
|---|---|---|---|---|---|---|---|---|---|---|---|
| | ratio between aggregates and binding material | | | amount of cordierite in binding material % by mass | heat | | | | | component | ratio of alkali metal % by mass |
| | | | binding | | firing | | treatment | | film | con- | con- |
| | aggregates kind of aggregates | aggregates % by mass | material % by mass | kind contained in binding material | | temperature °C. | time hr | temperature °C. | time hr | thickness μm | tent % by mass | tained in phase |
| Example 4 | SIC | 76.5 | 23.5 | cordierite, mullite, alumina | 80 | 1400 | 5 | 1350 | 5 | 2.1 | 17.8 | sodium | 0.12 |
| Example 5 | SIC | 76.5 | 23.5 | cordierite, mullite, alumina | 80 | 1400 | 5 | 1400 | 5 | 2.9 | 24.2 | sodium | 0.25 |
| Example 6 | SIC | 76.5 | 23.5 | cordierite, mullite, alumina | 80 | 1400 | 5 | 1100 | 5 | 0.5 | 5.2 | sodium | 0.12 |
| Example 7 | SIC | 76.5 | 23.5 | cordierite, mullite, alumina | 80 | 1400 | 5 | 1000 | 5 | 0.3 | 3.1 | sodium | 0.10 |
| Example 8 | SIC | 76.5 | 23.5 | cordierite, mullite, alumina | 80 | 1400 | 5 | 1300 | 20 | 2.5 | 19.9 | sodium | 0.20 |
| Example 9 | SIC | 76.5 | 23.5 | cordierite, mullite, alumina | 80 | 1400 | 5 | 1300 | 1 | 0.2 | 2.9 | sodium | 0.10 |
| Example 10 | SIC | 76.5 | 23.5 | cordierite, alumina | 80 | 1370 | 5 | 1300 | 5 | 1.4 | 12.9 | sodium | 0.20 |
| Example 11 | SIC | 76.5 | 23.5 | cordierite, mullite | 80 | 1440 | 5 | 1300 | 5 | 1.4 | 12.7 | sodium | 0.18 |
| Example 12 | SIC | 76.5 | 23.5 | cordierite, mullite, alumina | 80 | 1400 | 1 | 1300 | 5 | 1.4 | 13.1 | sodium | 0.22 |
| Example 13 | SIC | 76.5 | 23.5 | cordierite, mullite | 80 | 1400 | 20 | 1300 | 5 | 1.4 | 12.8 | sodium | 0.20 |
| Example 14 | SIC | 76.5 | 23.5 | cordierite, mullite, alumina | 50 | 1400 | 5 | 1300 | 5 | 1.5 | 12.1 | sodium | 0.18 |
| Example 15 | SIC | 76.5 | 23.5 | cordierite | 100 | 1400 | 5 | 1300 | 5 | 1.5 | 13.1 | sodium | 0.23 |
| Example 16 | SIC | 88 | 12 | cordierite, mullite, alumina | 80 | 1400 | 5 | 1300 | 5 | 1.3 | 15.1 | sodium | 0.22 |
| Example 17 | SIC | 80 | 20 | cordierite, mullite, alumina | 80 | 1400 | 5 | 1300 | 5 | 1.4 | 14.1 | sodium | 0.20 |
| Example 18 | SIC | 70 | 30 | cordierite, mullite, alumina | 80 | 1400 | 5 | 1300 | 5 | 1.3 | 11.8 | sodium | 0.15 |
| Example 19 | SIC | 55 | 45 | cordierite, mullite, alumina | 80 | 1400 | 5 | 1300 | 5 | 1.3 | 10.9 | sodium | 0.12 |
| Example 20 | $Si_3N_4$ | 76.5 | 23.5 | cordierite, mullite, alumina | 80 | 1390 | 5 | 1220 | 7 | 1.2 | 12.7 | sodium | 0.18 |
| Example 21 | $Si_3N_4$ | 80 | 20 | cordierite, mullite, alumina | 80 | 1390 | 5 | 1220 | 7 | 1.4 | 14.1 | sodium | 0.20 |
| Example 22 | $Si_3N_4$ | 70 | 30 | cordierite, mullite, alumina | 80 | 1390 | 5 | 1220 | 7 | 1.2 | 12.1 | sodium | 0.15 |
| Example 23 | SIC | 76.5 | 23.5 | cordierite, mullite, alumina | 80 | 1390 | 5 | 1220 | 7 | 1.3 | 14 | sodium | 0.22 |
| Example 24 | SIC | 76.5 | 23.5 | cordierite, mullite, alumina | 80 | 1400 | 5 | 1450 | 5 | 3.8 | 31.2 | sodium | 0.21 |
| Example 25 | SIC | 76.5 | 23.5 | amorphous cordierite, mullite | 80 | 1470 | 5 | 1300 | 5 | 1.3 | 12.8 | sodium | 0.17 |
| Example 26 | SIC | 76.5 | 23.5 | cordierite, alumina | 80 | 1350 | 5 | 1300 | 5 | 1.4 | 12.9 | sodium | 0.15 |
| Example 27 | SIC | 76.5 | 23.5 | cordierite, mullite, alumina | 30 | 1400 | 5 | 1300 | 5 | 1.4 | 12.9 | sodium | 0.25 |
| Example 28 | SIC | 90 | 10 | amorphous cordierite, mullite | 80 | 1470 | 5 | 1300 | 5 | 1.3 | 16 | sodium | 0.12 |
| Comparative Example 1 | — | — | 100 | cordierite | 100 | — | — | 1430 | 5 | — | — | — | — |
| Comparative Example 2 | SIC | 76.5 | 23.5 | cordierite, mullite, alumina | 80 | 1390 | 5 | — | — | — | — | — | — |
| Comparative Example 3 | — | — | 100 | cordierite | 100 | 1400 | 5 | 1300 | 5 | — | — | — | — |

TABLE 2

| | physical properties of materials | | | | | |
|---|---|---|---|---|---|---|
| | porosity % | average pore diameter μm | thermal expansion coefficient ppm/K | bending strength MPa | softening temperature ° C. | total evaluation |
| Example 1 | 65.2 | 19 | 4.6 | 10.2 | 1460 | A |
| Example 2 | 65.2 | 18.9 | 4.5 | 10.1 | 1460 | A |
| Example 3 | 64.1 | 19.2 | 4.6 | 9.8 | 1451 | A |
| Example 4 | 62.5 | 19.3 | 5.0 | 10.2 | 1475 | B |
| Example 5 | 60.2 | 19.9 | 5.4 | 10.9 | 1450 | B |
| Example 6 | 66.2 | 18.2 | 4.3 | 10.3 | 1430 | B |
| Example 7 | 66.2 | 18.2 | 4.3 | 10.9 | 1420 | B |
| Example 8 | 61.8 | 18.6 | 5.1 | 9.8 | 1465 | B |
| Example 9 | 65.6 | 18.0 | 4.0 | 10.8 | 1420 | B |
| Example 10 | 64.6 | 18.9 | 4.5 | 9.9 | 1453 | A |
| Example 11 | 63.9 | 19.2 | 4.7 | 10.9 | 1461 | A |
| Example 12 | 65.2 | 18.2 | 4.5 | 9.7 | 1451 | A |
| Example 13 | 64.8 | 18.8 | 4.6 | 10.2 | 1455 | A |
| Example 14 | 66.1 | 17.8 | 5.1 | 11.1 | 1439 | B |
| Example 15 | 64.5 | 18.7 | 4.4 | 9 | 1460 | A |
| Example 16 | 67 | 15.5 | 5.1 | 8.5 | 1472 | B |
| Example 17 | 65.6 | 18.2 | 4.8 | 9.3 | 1460 | A |
| Example 18 | 64.5 | 19.8 | 4.5 | 11.2 | 1461 | A |
| Example 19 | 63.4 | 21.5 | 4.2 | 12.6 | 1468 | A |
| Example 20 | 64.8 | 19 | 4.6 | 10.2 | 1456 | A |
| Example 21 | 65.3 | 18.5 | 4.7 | 9.5 | 1455 | A |
| Example 22 | 64.1 | 19.5 | 4.5 | 10 | 1450 | A |
| Example 23 | 65.1 | 19.6 | 4.5 | 10.1 | 1459 | A |
| Example 24 | 57.5 | 20.5 | 5.8 | 16.8 | 1450 | C |
| Example 25 | 58.9 | 21.2 | 5.8 | 16 | 1445 | C |
| Example 26 | 64.6 | 18.9 | 4.5 | 4.9 | 1453 | C |
| Example 27 | 66.2 | 17.8 | 5.6 | 13.1 | 1429 | C |
| Example 28 | 59.2 | 20.1 | 5.9 | 15.5 | 1432 | C |
| Comparative Example 1 | 63.9 | 20.9 | 1.9 | 8.5 | 1416 | D |
| Comparative Example 2 | 64.8 | 18.8 | 3.8 | 10.9 | 1418 | D |
| Comparative Example 3 | 64.2 | 20.1 | 1.8 | 8.3 | 1395 | D |

Examples 2 to 28 and Comparative Examples 1 to 3

A honeycomb structure was prepared in a similar manner to Example 1 except that conditions were changed as shown in Table 1. For the prepared honeycomb structure, measurement of a "softening temperature" and measurement of the above items were performed in a similar manner to Example 1. Table 2 shows results thereof.

Tables 1 and 2 indicate that porous materials (honeycomb structures) in Examples 1 to 28 are not easily damaged even when being exposed to a high temperature in a low oxygen atmosphere, and has heat resistance improved as compared with porous materials (honeycomb structures) in Comparative Examples 1 to 3. At this time, the softening temperature is preferably 1420° C. or higher, more preferably from 1435 to 1475° C., and particularly preferably from 1440 to 1470° C. By satisfying such a range, heat resistance of a binding phase can be improved, and thermal deformation of a filter can be suppressed. When the softening temperature is lower than 1420° C., heat resistance is reduced, and a filter may be damaged.

INDUSTRIAL APPLICABILITY

The porous material according to the present invention can be used for a filter to purify an exhaust gas of an automobile or the like. In addition, the honeycomb structure according to the present invention can be used for a filter to purify an exhaust gas of an automobile or the like. The method for manufacturing a porous material according to the present invention can be used as a method for manufacturing a porous material which can be used for a filter to purify an exhaust gas of an automobile or the like.

DESCRIPTION OF REFERENCE NUMERALS:

1: partition wall, 2: cell, 2a: inflow cell, 2b: outflow cell, 8: plugging portion, 11: first end face, 12: second end face, 15: bonding layer, 17: honeycomb segments, 20: outer periphery coat layer, 30: aggregates, 32: binding material, 35: phase containing oxygen, 37: pore, 40: balance weight, 45: measurement apparatus, 50: test piece, 100: honeycomb structure.

What is claimed is:
1. A porous material comprising:
 aggregates formed of a nonoxide containing silicon; and
 a binding material formed of an oxide ceramic binding the aggregates to each other while keeping a plurality of pores,
 wherein the porous material has a phase containing oxygen on a surface of the aggregates including a boundary surface with the binding material, and
 wherein the porous material has a thermal expansion coefficient of $5.5 \times 10^{-6}$/K or less.
2. The porous material according to claim 1, wherein a content ratio of oxygen in the aggregates is from 2 to 25% by mass relative to the mass of the aggregates.
3. The porous material according to claim 1, wherein the phase containing oxygen contains cristobalite.
4. The porous material according to claim 2, wherein the phase containing oxygen contains cristobalite.

5. The porous material according to claim 1, wherein the binding material contains crystalline cordierite in an amount of 50% by mass or more relative to the total amount of the binding material.

6. The porous material according to claim 5, wherein the binding material further contains at least one selected from a group consisting of amorphous cordierite, alumina, mullite, spinel, sapphirine, and cristobalite.

7. The porous material according to claim 1, wherein the phase containing oxygen has a film thickness of 0.2 to 3.0 µm.

8. The porous material according to claim 2, wherein the phase containing oxygen has a film thickness of 0.2 to 3.0 µm.

9. The porous material according to claim 3, wherein the phase containing oxygen has a film thickness of 0.2 to 3.0 µm.

10. The porous material according to claim 4, wherein the phase containing oxygen has a film thickness of 0.2 to 3.0 µm.

11. The porous material according to claim 5, wherein the phase containing oxygen has a film thickness of 0.2 to 3.0 µm.

12. The porous material according to claim 6, wherein the phase containing oxygen has a film thickness of 0.2 to 3.0 µm.

13. The porous material according to claim 1, wherein the aggregates are formed of silicon carbide.

14. The porous material according to claim 1, having a porosity of 35 to 75%.

15. A method for manufacturing a porous material, comprising:

a forming step of obtaining a mixture by adding and mixing a raw material for a binding material containing a cordierite forming raw material and an organic binder to powdery aggregates formed of a nonoxide containing silicon, and then forming the mixture to obtain a formed body;

a firing step of calcinating the obtained formed body in an atmosphere containing oxygen to remove the organic binder in the formed body, and then firing the formed body in a temperature range of 1370 to 1450° C. to obtain a porous fired body in which the powdery aggregates are bound to each other with an oxide ceramic; and a porous material forming step of subjecting the obtained fired body to a heat treatment in a temperature range of 1000 to 1400° C. in an atmosphere containing oxygen, and thereby forming a phase containing oxygen on a surface of the powdery aggregates including a boundary surface with the oxide ceramic to obtain a porous material, wherein the porous material has a thermal expansion coefficient of $5.5 \times 10^{-6}$/K or less.

16. The method for manufacturing a porous material according to claim 15, wherein the phase containing oxygen contains an alkali metal in an amount of 0.05% by mass or more relative to the porous material.

17. A honeycomb structure formed by the porous material according to claim 1, having a shape including a partition wall defining a plurality of cells extending from a first end face as one end face to a second end face as the other end face.

18. The honeycomb structure according to claim 17, comprising a plugging portion disposed in each of an open end of a predetermined cell on the first end face and an open end of a residual cell on the second end face.

\* \* \* \* \*